(12) United States Patent
Zhao et al.

(10) Patent No.: US 11,015,278 B2
(45) Date of Patent: May 25, 2021

(54) WASHING MACHINE

(71) Applicant: QINGDAO HAIER WASHING MACHINE CO., LTD., Shandong (CN)

(72) Inventors: Zhiqiang Zhao, Shandong (CN); Sheng Xu, Shandong (CN)

(73) Assignee: QINGDAO HAIER WASHING MACHINE CO., LTD., Shandong (CN)

( * ) Notice: Subject to any disclaimer, the term of this patent is extended or adjusted under 35 U.S.C. 154(b) by 79 days.

(21) Appl. No.: 16/484,055

(22) PCT Filed: Jan. 23, 2018

(86) PCT No.: PCT/CN2018/073831
§ 371 (c)(1),
(2) Date: Aug. 6, 2019

(87) PCT Pub. No.: WO2018/141217
PCT Pub. Date: Aug. 9, 2018

(65) Prior Publication Data
US 2020/0002869 A1    Jan. 2, 2020

(30) Foreign Application Priority Data

Feb. 6, 2017   (CN) .......................... 201710065854.1

(51) Int. Cl.
*D06F 39/08*     (2006.01)
*D06F 37/12*     (2006.01)
(Continued)

(52) U.S. Cl.
CPC .............. *D06F 37/12* (2013.01); *D06F 37/26* (2013.01); *D06F 33/00* (2013.01); *D06F 39/083* (2013.01);
(Continued)

(58) Field of Classification Search
CPC .......... D06F 21/06; D06F 21/08; D06F 21/10; D06F 23/04; D06F 23/06; D06F 23/065;
(Continued)

(56) References Cited

U.S. PATENT DOCUMENTS 5,152,159 A   10/1992 Kabeya et al.
2013/0036774 A1*  2/2013 Kim ...................... D06F 39/083
                                                    68/142

FOREIGN PATENT DOCUMENTS

CN       2614216 Y      5/2004
CN     104805642 A      7/2015
(Continued)

OTHER PUBLICATIONS

International Search Report for related PCT Application No. PCT/CN2018/073831 dated Apr. 23, 2018.

*Primary Examiner* — David G Cormier
(74) *Attorney, Agent, or Firm* — Burns & Levinson, LLP; Joseph M. Maraia

(57) ABSTRACT

Provided is a washing machine, including an inner drum and an outer drum. A bottom or a side wall of the inner drum is provided with an inner drum drainage hole. The inner drum drainage hole is provided with a drainage valve. The outer drum is provided with a power device configured to push a spool of the drainage valve, and an outer drum drainage hole. One end of the drainage valve facing toward the outer drum is provided with a drainage switch. An extending shaft of the power device is configured to extend and touch the drainage switch to open or close the drainage valve.

9 Claims, 8 Drawing Sheets

(51) Int. Cl.
*D06F 37/26* (2006.01)
*D06F 33/00* (2020.01)
(52) U.S. Cl.
CPC ...... *D06F 39/088* (2013.01); *D06F 2204/086* (2013.01)
(58) Field of Classification Search
CPC .......... D06F 33/42; D06F 33/47; D06F 33/62; D06F 33/74; D06F 37/12; D06F 37/26; D06F 39/08; D06F 39/083
See application file for complete search history.

(56) References Cited

FOREIGN PATENT DOCUMENTS

| | | | |
|---|---:|---|---|
| JP | 03284285 | A | 12/1991 |
| JP | 03284294 | A | 12/1991 |
| JP | 042398 | A | 1/1992 |
| JP | 0461896 | A | 2/1992 |

* cited by examiner

WASHING MACHINE

CROSS REFERENCE TO RELATED APPLICATIONS

This application is a United States national phase application of co-pending international patent application number PCT/CN2018/073831, filed on Jan. 23, 2018, which claims priority to Chinese patent application No. 201710065854.1, filed on Feb. 6, 2017, disclosures of both of which are incorporated herein by reference in their entireties.

TECHNICAL FIELD

The present disclosure relates to the technical field of household appliances, for example, a washing machine.

BACKGROUND

The washing machine in the related art, whether it is a drum washing machine or a pulsator washing machine, is provided with a plurality of holes on the inner drum. During the water feeding and the washing stage, the water in the inner drum flows into the space formed by the outer drum and the inner drum through the holes. Since the washing water is contained with the dirt, the detergent and the like, and the holes cannot be closed in the washing stage, during the washing stage, the washing water rotates back and forth in the space formed by the outer wall of the inner drum and the inner wall of the outer drum, and the dirt and the detergent are left on the outer wall of the inner drum and the inner wall of the outer drum. After a long time use of the washing machine, the dirt and the detergent are accumulated. The space formed by the outer wall of the inner drum and the inner wall of the outer drum cannot be cleaned by the user, and is relatively moist after the washing, providing necessary conditions for the bacterial growth. At the same time, during the water feeding, the space needs to be fed water having a water level as high as the inner drum to make the drum operate normally. However, the water in the space tends to have little laundry effect in the washing stage, which causes to water waste to some extent.

SUMMARY

Provided is a washing machine, so that the water will not enter into the space formed by the outer wall of the inner drum and the inner wall of the outer drum during the laundry process, and at the same time the water can be normally discharged out of the washing machine after the washing stage, without causing water waste.

Provided is a washing machine, including an inner drum and an outer drum. A bottom or a side wall of the inner drum is provided with an inner drum drainage hole. The inner drum drainage hole is provided with a drainage valve. The outer drum is provided with a power device configured to push a valve core of the drainage valve, and an outer drum drainage hole. One end of the drainage valve facing toward the outer drum is provided with a drainage switch. An extending shaft of the power device is configured to extend and touch the drainage switch to open or close the drainage valve.

The inner drum is only provided with the inner drum drainage hole, and the inner drum drainage hole is provided with a drainage valve, thus, when the drainage valve is closed, the water in the inner drum cannot flow into the outer drum, thereby preventing the dirt, the detergent and the like from remaining on the walls of the inner drum and the outer drum, and preventing the bacterial growth. At the same time, the water in the inner drum cannot flow into the outer drum, which can effectively reduce the water consumption of laundry and save the water resource. Since the extending shaft of the power device touches the drainage switch to open or close the drainage switch so as to open or close the drainage valve, no connection relationship exists between the drainage valve and the power device, and the drainage valve can be opened or closed without positioning the drainage valve. Since the outer drum drainage hole is arranged at the bottom of the outer drum, the water passing through the drainage valve is accumulated at the bottom of the outer drum, and will not fill in the space formed by the inner drum and the outer drum to cause the problem of the dirt being accumulated on the drum wall. Since there is no water between the inner drum and the outer drum during the washing stage, the water in the inner drum is not contaminated by the dirt accumulated on the bottom of the outer drum.

In one embodiment, the drainage switch includes a switch case and a button body. The button body includes a touching portion and a pushing pillar. The pushing pillar is arranged at one end of the button body facing toward the drainage valve, and configured to push the valve core of the drainage valve to move toward the inner drum.

The drainage switch is provided with the touching portion, so that the extending shaft of the power device is in contact with the drainage switch. At the same time, the button body is provided with a pushing pillar, so that the extending shat touches and pushes the touching portion to change the positional status of the touching portion, so that the pushing pillar is driven to push the valve core to communicate the inner drum and the outer drum to discharge the water in the inner drum.

In one embodiment, the touching portion includes a working portion and a recess portion. The pushing pillar and the recess portion are located at a same side of the drainage switch.

The working portion is a portion that is directly in contact with the extending portion, while the recess portion is a portion that moves toward a direction opposite to drainage valve when the working portion is pushed by the extending shaft. The pushing pillar and the recess portion are located at the same side of the drainage switch, so that the pushing pillar moves along with the button body, and the drainage switch normally functions.

In one embodiment, the drainage valve includes a valve case, the valve core arranged in the valve case, and a spring. A sealing groove is arranged on a side wall of the valve core. A sealing ring is arranged in the sealing groove. A top of the valve core is abutted against a first end of the spring, and a second end of the spring is abutted against one end of the valve case facing toward the inner drum drainage hole.

Such structure enables the drainage valve to be a check valve, so that the case that the accumulated water flows backward into the inner drum will not occur when the water is accumulated in the space formed by the outer drum and the inner drum. At the same time, the valve core can move up and down, and the valve core can return to the original state when the drainage valve is closed.

In one embodiment, the sealing ring is an O-shaped rubber sealing ring, an inner wall of the valve case is provided with a third inclined side wall fitted with the sealing ring.

The third inclined side wall is arranged to ensure a good sealing in the drainage valve, so that the third inclined side wall are better cooperated with the O-shaped rubber sealing ring, and the washing water is prevented from arbitrarily flowing out of the outer drum during the washing stage to affect the washing. The sealing ring is the O-shaped rubber sealing ring, when the drainage valve is closed, the sealing ring is squeezed and deformed, so that the part of the outer side of the sealing ring in contact with the valve case is better sealed, and the case of water leakage will not occur.

In one embodiment, a side wall of the sealing ring in contact with the valve case is an arc shape. An inner wall of the valve case is provided with a third inclined side wall fitted with an arc shaped side wall of the sealing ring.

By arranging the side wall of the sealing ring in contact with the valve case to be the arc shape structure, the sealing ring is squeezed and deformed when the drainage valve is closed, the side wall of the sealing ring is completely fitted to the third inclined side wall of the valve case, and the good sealing is maintained.

In one embodiment, the pushing pillar and a lower portion of the valve core or the whole valve core are made of magnetic materials. A polarity of one side of the pushing pillar facing toward the valve core is opposite to a polarity of one side of the valve core facing toward the pushing pillar.

The pushing pillar and the lower portion of the valve core or the whole valve core are made of the magnetic materials, which better enables the pushing pillar to push the valve core and the recess portion to be more reliably recessed. Even if the power device is powered off and the extending shaft recovers, the drainage by the drainage valve can still be ensure, which greatly saves the electricity consumption required for the drainage.

In one embodiment, a water flowing hole is arranged on a side wall of the switch case.

In one embodiment, the power device is a push rod motor.

In one embodiment, the inner drum is provided with a dewatering hole above a highest water line.

In one embodiment, the washing machine is a pulsator washing machine or a drum washing machine.

1—inner drum; 11—inner drum drainage hole; 12—dewatering hole; 2—outer drum; 21—outer drum drainage hole; 3—drainage valve; 31—valve core; 311—sealing groove; 32—valve case; 321—third inclined side wall; 322—stop ring; 33—spring; 4—power device; 41—extending shaft; 5—drainage switch; 51—switch case; 511—water flowing hole; 52—button body; 521—pushing pillar; 53—touching portion; 531—working portion; 532—recess portion; 6—sealing ring; 7—washing machine outer case; 71—base; 72—upper cover; 73—base plate; 74—foot; 8—pulsator; 81—rotary motor; 9—lint filter; 10—drainage pipe.

DETAILED DESCRIPTION

The technical problem needed to be solved by the persons skilled in the art is how to provide a washing machine, so that the water will not enter into the space formed by the outer wall of the inner drum and the inner wall of the outer drum during the laundry process, and at the same time the water can be normally discharged out of the washing machine after the washing stage, without causing water waste.

Embodiment I

Figure 1:
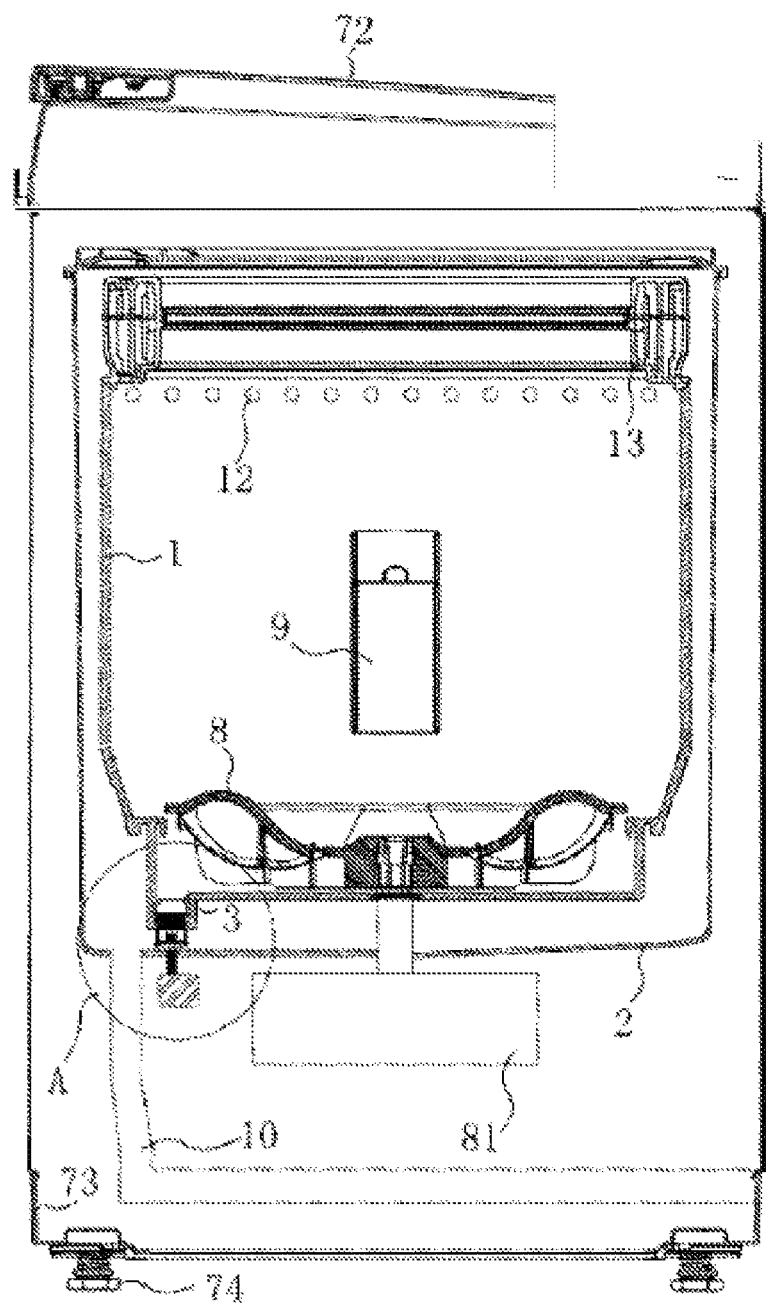
FIG. 1 is a structural schematic diagram illustrating a washing machine provided by embodiment I.
Figure 2:
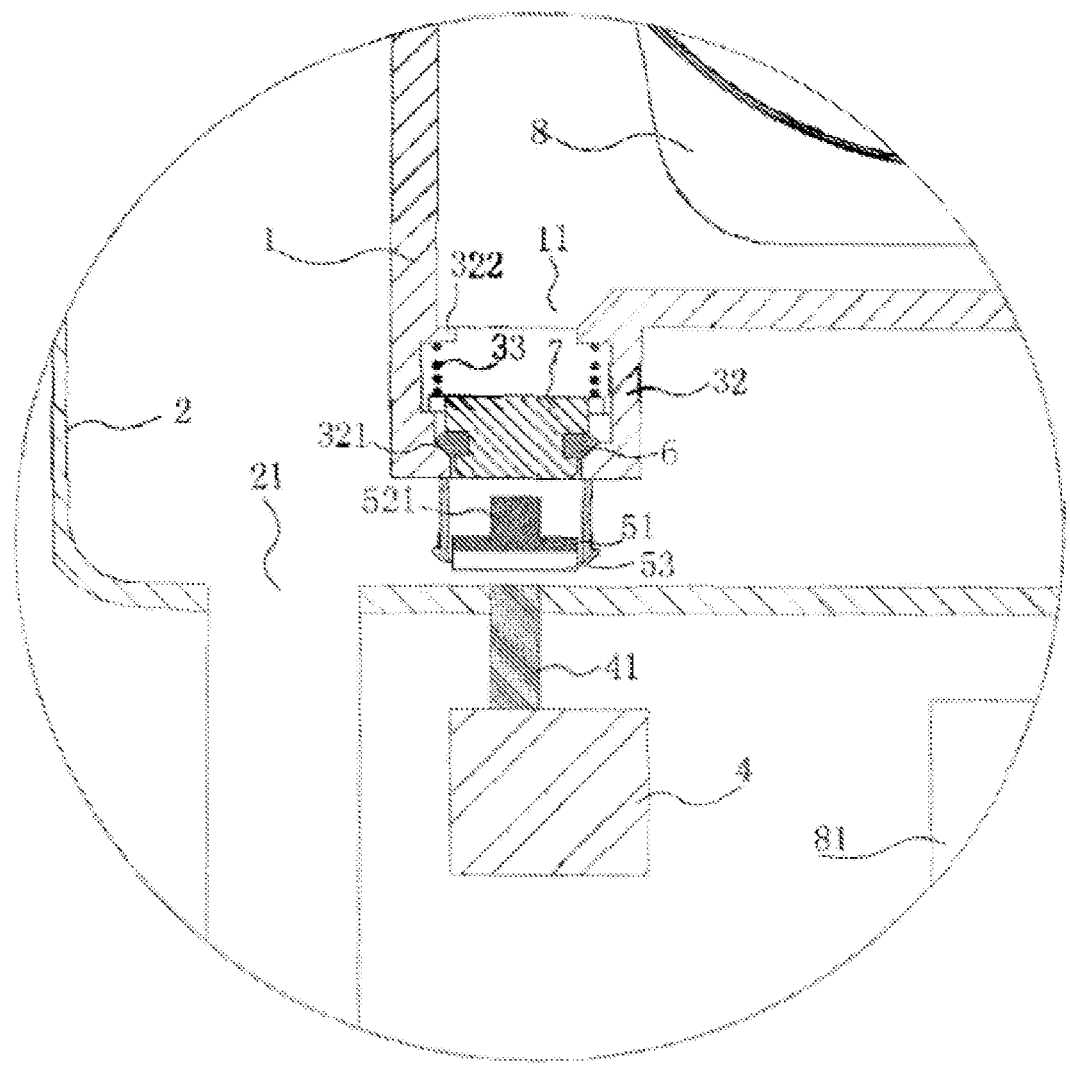
FIG. 2 is a partial enlarged view at A in FIG. 1.
Figure 5:
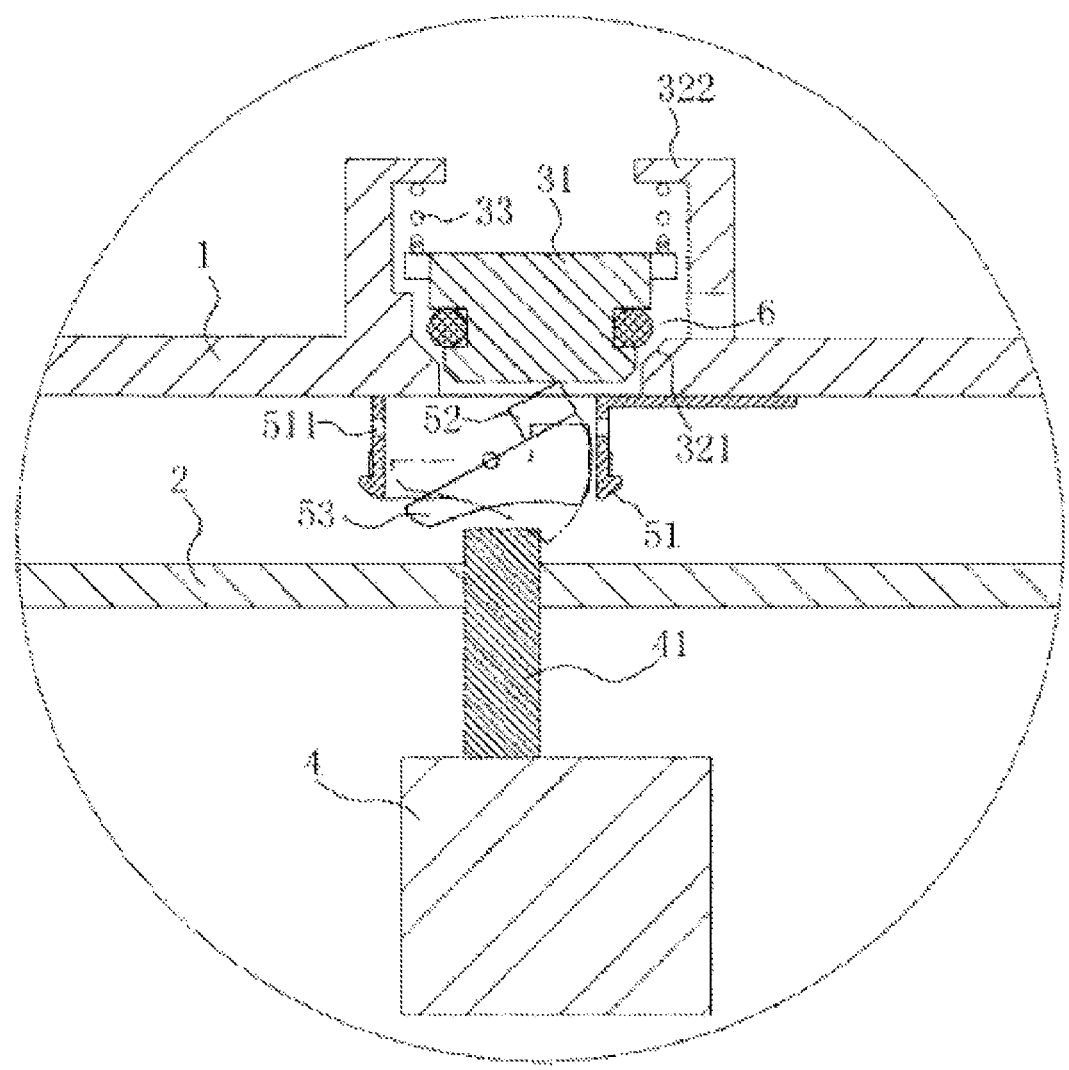
FIG. 5 is a structural schematic diagram illustrating the opening of the drainage switch provided by embodiment I.
Figure 6:
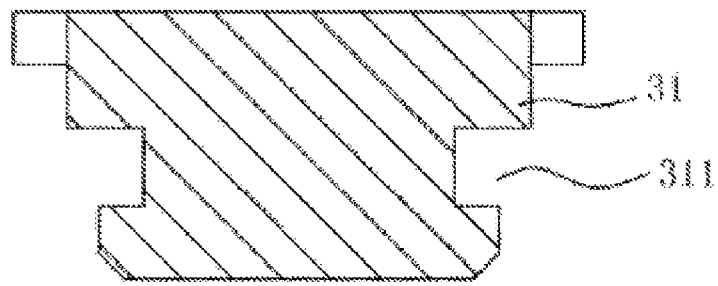
FIG. 6 is a structural schematic diagram illustrating a spool provided by embodiment I.

A washing machine provided by the present embodiment includes an inner drum 1 and an outer drum 2. As shown in FIG. 1, FIG. 2 and FIG. 5, a bottom of the inner drum 1 is provided with an inner drum drainage hole 11. The inner drum drainage hole 11 is provided with a drainage valve 3. The outer drum 2 is provided with a power device 4 for pushing a valve core 31 of the drainage valve 3, and an outer drum drainage hole 21. The outer drum drainage hole 21 is communicated with a drainage pipe 10 to discharge the water out of a washing machine outer case 7. The outer drum drainage hole 21 is located on the bottom of the outer drum 1 to discharge the waste water. One end of the drainage valve 3 facing toward the outer drum 2 is provided with a drainage switch 5. An extending shaft 41 of the power device 4 extends and touches the drainage switch 5 to open or close the drainage valve 3. The power device 4 is a push rod motor. Such structure can convert a circumferential motion into a linear motion.

The drainage valve is arranged on the bottom of the inner drum, and may be tiled at a certain angle.

The opening process of the drainage valve 3 is as follows.

The inner drum 1 rotates, and the extending shaft 41 of the power device 4 extends upward. When the drainage switch 5 overlapping on the drainage valve 3 is in contact with the extending shaft 41, since the inner drum 1 still rotates, the drainage switch 5 is pushed by the extending shaft 41 to move upward to push the valve core 31, so that the drainage valve 3 is opened. When the drainage valve needs to be closed, the inner drum 1 rotates in an opposite direction, the extending shaft 41 is in contact with the drainage switch 5 again, and pushes the drainage switch 5 to move upward, so that the valve core 31 falls and the drainage valve 3 is closed.

Figure 3:
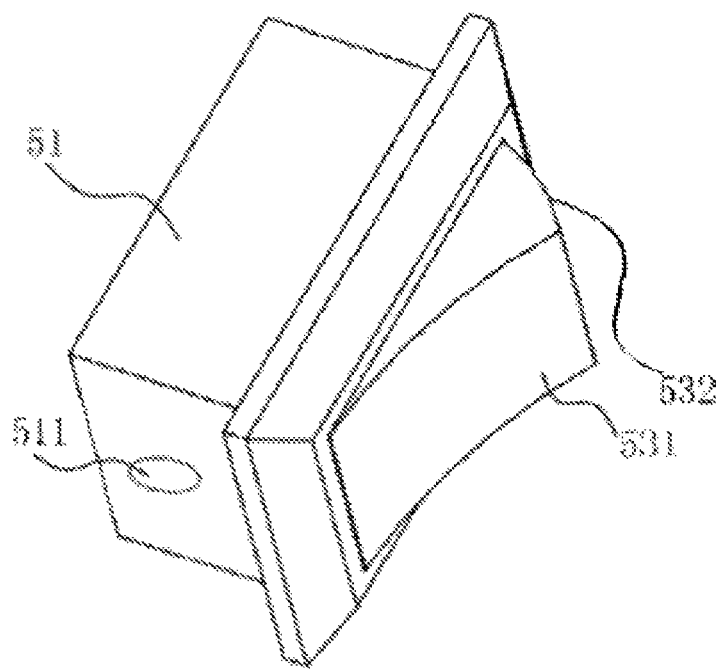
FIG. 3 is a structural schematic diagram illustrating a drainage switch provided by embodiment I.
Figure 4:
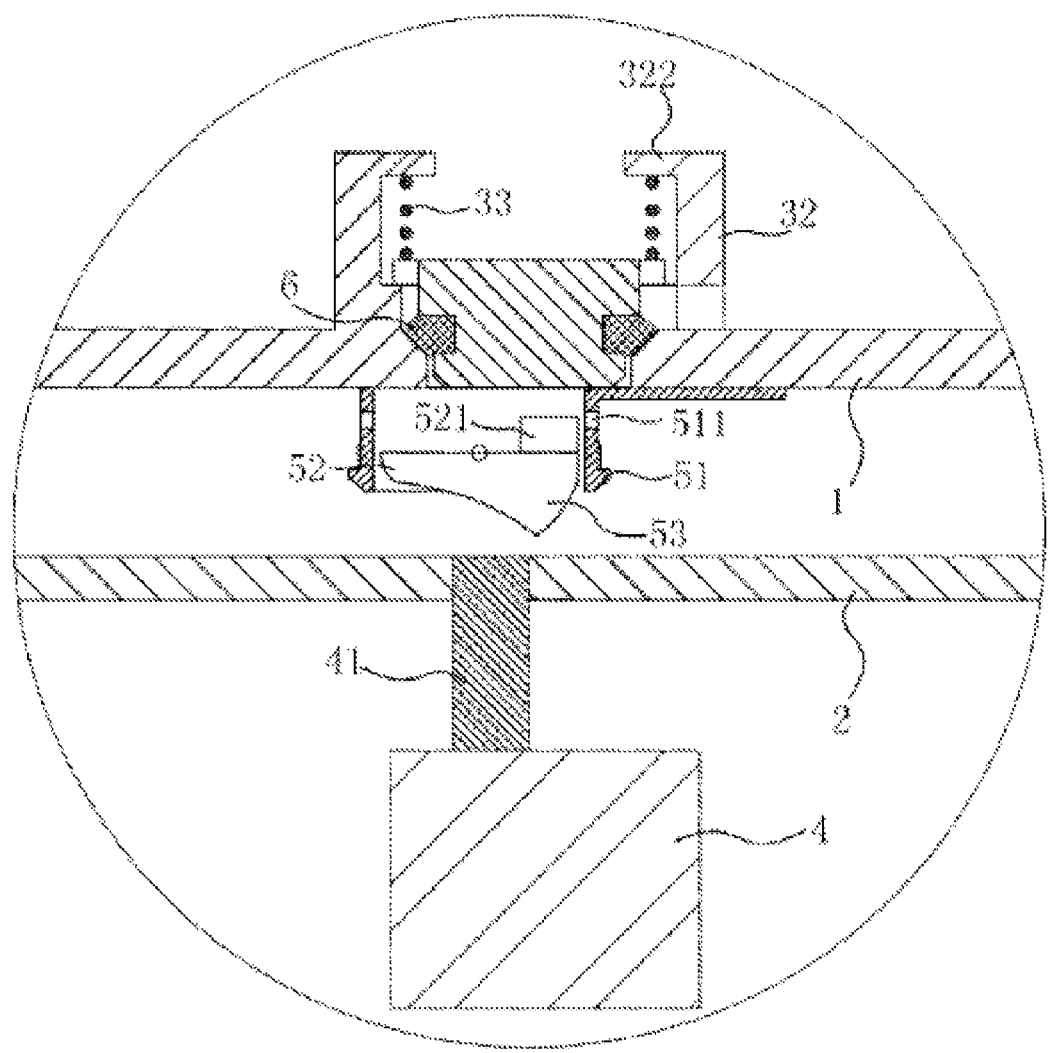
FIG. 4 is a structural schematic diagram illustrating the closing of the drainage switch provided by embodiment I.

The drainage switch 5 is similar in construction to a rocker switch. As shown in FIG. 3 to FIG. 5, the drainage switch 5 includes a switch case 51 and a button body 52. The button body 52 includes a touching portion 53 and a pushing pillar 521. The pushing pillar 521 is arranged at one end of the button body 52 facing toward the drainage valve 3. The pushing pillar 521 is configured to push the valve core 31 of the drainage valve 3 to move toward the inner drum 1. In order to make the pushing pillar 521 better cooperate with the valve core 31, the pushing pillar 521 and a lower portion of the valve core 31 or the whole spool are made of magnetic materials. In one embodiment, the magnetic material is a magnet. In order to form an attraction relationship between the pushing pillar 521 and the valve core 31, a polarity of one side of the pushing pillar 521 facing toward the valve core 31 is opposite to a polarity of one side of the valve core 31 facing toward the pushing pillar 521.

As shown in FIG. 3, the touching portion 53 includes a working portion 531 and a recess portion 532. The pushing pillar 521 and the recess portion 532 are located in the same side of the drainage switch 5. As shown in FIG. 4, the touching portion 53 is a rocker structure. The working portion 531 and the recess portion 532 are both a triangular or wedge structure. The side surfaces of the working portion 531 and the recess portion 532 in contact with the extending shaft 41 are arc side surfaces. An arc center of the arc side surface of the working portion 531 in contact with the extending shaft 41 is directed in a direction opposite to the inner drum. An arc center of the arc side surface of the recess portion 532 in contact with the extending shaft 41 is directed in a direction the same as the inner drum. At the same time, a junction of the working portion 531 and the recess portion 532 is a highest point of the touching portion. By arranging the side surfaces of the working portion 531 and the recess portion 532 in contact with the extending shaft 41 to be an arc side surface, the structure can ensure that the drainage switch 5 is opened or closed by the extending shaft 41, and at the same time, the recess portion 532 slides into the switch case 51.

In one embodiment, one end of the working portion 531 facing toward the recess portion 532 is a valve opening contact, and another end of the working portion 531 facing away from the recess portion 532 is a valve closing contact. The drainage switch 5 further includes an elastic member (not shown in the drawings), so that the button body 52 realizes, in condition that the drainage valve 3 is closed, that the valve opening contact protrudes and the valve closing contact is recessed.

The touching portion and the button body are an integrated structure. The button body 52 and the switch case 51 are rotatably connected.

As shown in FIG. 2, FIG. 4, FIG. 5 and FIG. 6, the drainage valve 3 includes a valve case 32, a valve core 31 arranged inside the valve case 32, and a spring 33. A side wall of the valve core 31 is provided with a sealing groove 311 for realizing the sealing between the valve core and the valve case and avoiding water leakage. A sealing ring 6 is arranged inside the sealing groove 311. A top of the valve core 31 is abutted against a first end of the spring 33, and a second end of the spring 33 is abutted against one end of the valve case 32 facing toward the inner drum drainage hole 11. The one end of the valve case 32 facing toward the inner drum drainage hole 11 is provided with a stop ring 322, so that the valve case 32 is abutted against the spring 33. The above structure can be understood that the drainage valve 3 is a check valve.

As shown in FIG. 5, the sealing ring 6 is an O-shaped rubber sealing ring. The O-shaped rubber sealing ring is commonly used, and the economic cost will not be increased. At the same time, an inner wall of the valve case 32 is provided with a third inclined side wall 321 fitted with the sealing ring 6, so that the drainage valve is better sealed when the drainage valve is closed.

Figure 7:
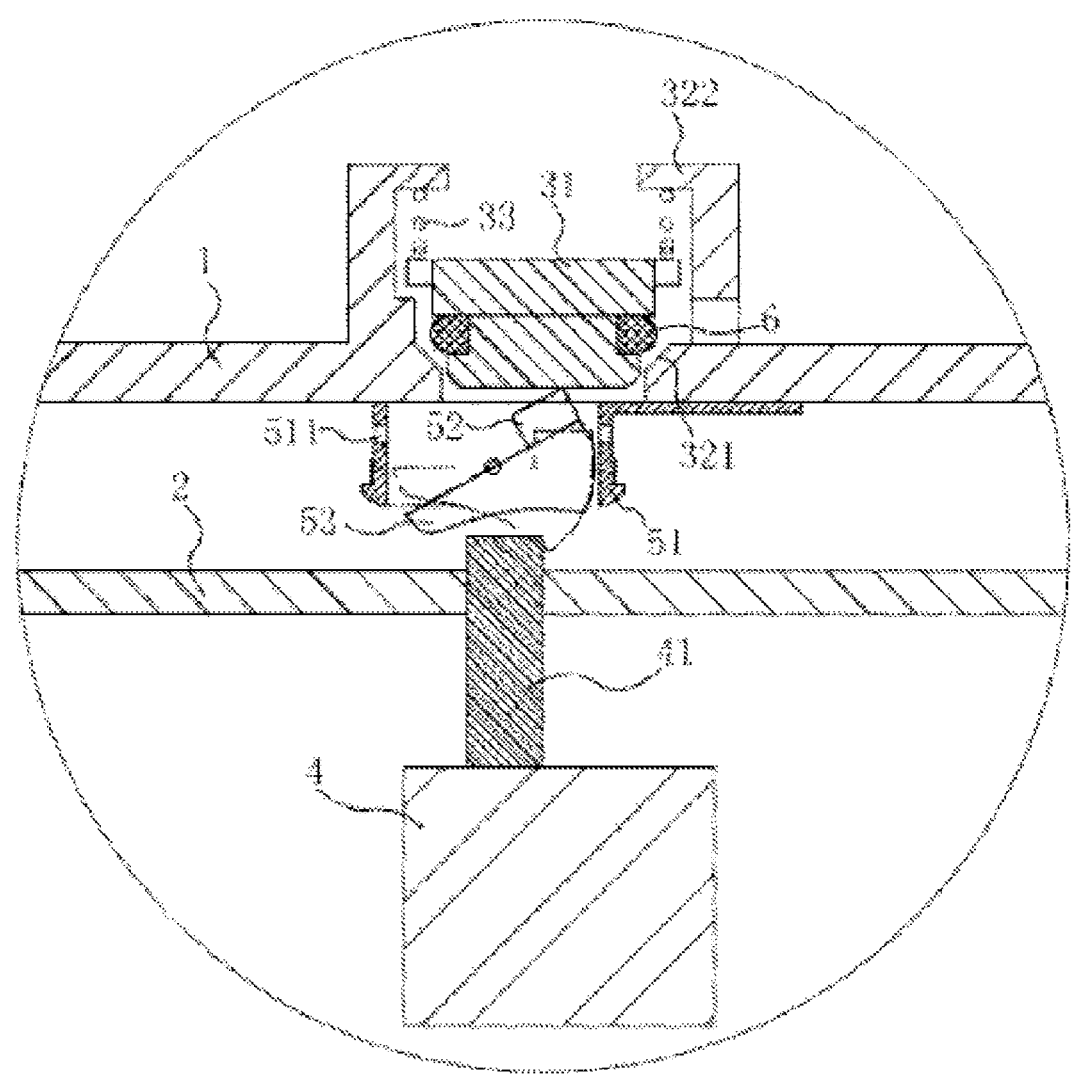
FIG. 7 is a structural schematic diagram illustrating a sealing ring having an outer side wall in an arc shape in the washing machine provided by embodiment I.

In one embodiment, a side wall of the sealing ring 6 in contact with the valve case 32 (referring to FIG. 7) is an arc shape. A part of the sealing ring 6 entering into the sealing groove 311 is a rectangular shape. The inner wall of the valve case 32 is provided with the third inclined side wall 321 fitted with the sealing ring 6. By arranging the side wall of the sealing ring 6 in contact with the valve case 32 to be an arc shape structure, the sealing ring 6 can be squeezed and deformed when the drainage valve 3 is closed, the side wall of the sealing ring 6 can completely fitted to the third inclined side wall of the valve case 32, and a good sealing can be maintained. In order to speed up the drainage speed, the side wall of the switch case 51 is further provided with a water flowing hole 511. The water flowing hole 511 may be arranged on the side wall of the switch case 51 arranged along a rotating direction of the inner drum 1, so that the water flow rate can be relatively fast.

Since the inner drum is an inner drum without holes, the water cannot be discharged in time during the clothes drying stage. In order to solve this problem, the inner drum 1 of the present embodiment is further provided with a dewatering hole 12 above a highest water level. When the inner drum rotates, the water in the clothes is spun out at a high speed, in a shape of inverted cone, and can flow out of the inner drum 1 through the dewatering hole 12, realizing the spin-drying operation.

The drainage process of the washing machine is as follows.

A rotary motor 81 drives the inner drum 1 to rotate clockwise, at the same time, the extending shaft 41 of the power device 4 extends. When the extending shaft 41 is in contact with the touching portion 53 of the drainage switch 5, the extending shaft 41 continues to extend to contact with the working portion 531, and further tightly presses the working portion 531. Since the inner drum 1 rotates, the working portion 531 is squeezed to move into the switch case 51. The pushing pillar 521 moves along with the switch case 51 to push the valve core 31 to move into the inner drum. During the moving process of the valve core 31, the spring 33 is pushed to be compressed. Since the pushing pillar 521 and the valve core 31 attract to each other to form the attraction relationship, a downward recovery force of the spring 33 is smaller than an upward pushing force of the pushing pillar 521. At this moment, the drainage valve 3 is opened, and the extending shaft 41 of the power device 4 stops extending.

After the drainage is completed, the rotary motor 81 drives the inner drum 1 to rotate counterclockwise, at the same time, the extending shaft 41 of the power device 4 extends. When the extending shaft 41 is in contact with the touching portion 53 of the drainage switch 5, one end of the touching portion 53 is lifted up to form a water flowing hole with the switch case 51. When the rotary motor 81 rotates counterclockwise, the extending shaft 41 can make the touching portion 53 back to an original position, to further close the drainage switch 5.

The inner drum 1 and the outer drum 2 are arranged inside the washing machine outer case 7. A base 71 and an upper cover 72 are arranged on the washing machine outer case 7. A base plate of 73 and a foot 74 is arranged below the washing machine outer case 7. A pulsator 8 is arranged inside the inner drum 1. And one or more lint filters 9 are arranged on the inner wall of the inner drum 1.

The washing machine may be the pulsator washing machine or drum washing machine.

The drainage switch of the present embodiment is the rocker switch. The rocker switch is long in service life, and safe and reliable. The on and off operation can reach more than 50,000 times. The washing machine is operated according to a one time washing and two-time rinsing program, and the on and off operation of the drainage switch 5 is three times for one time laundry. The washing machine is used three times a week according to the user, the on and off operation is about 3285 times for one year. The space-separated fast-switching check valve can be used for at least fifteen years, and thus the life fully meets the requirement of the washing machine.

In the washing machine provided by the present embodiment, the inner drum 1 is only provided with the inner drum drainage hole 11, and the inner drum drainage hole 11 is provided with the drainage valve 3. When the drainage valve 3 is closed, the water in the inner drum 1 cannot flow into the outer drum 2, thereby preventing the dirt, the detergent and the like from remaining on the walls of the inner drum and outer drum, and preventing the bacterial growth. At the same time, the water in the inner drum 1 cannot flow into the outer drum 2, which can effectively reduce the water consumption of laundry and save the water resource. Since the extending shaft of the power device touches the drainage switch to open or close the drainage valve 3, no connection relationship exists between the drainage valve 3 and the power device 4, and the drainage valve 3 can be opened or closed without positioning the drainage valve 3. Since the outer drum drainage hole 21 is arranged at the bottom of the outer drum 2, the water passing through the drainage valve 3 is accumulated at the bottom of the outer drum 2, and will not fill in the space formed by the inner drum 1 and the outer drum 2 to cause the problem of the dirt being accumulated on the drum wall. Since there is no water between the inner drum 1 and the outer drum 1 during the washing stage, the water in the inner drum 1 is not contaminated by the dirt accumulated on the bottom of the outer drum.

Embodiment II

The differences between the present embodiment and embodiment I are as follows.

Figure 8:
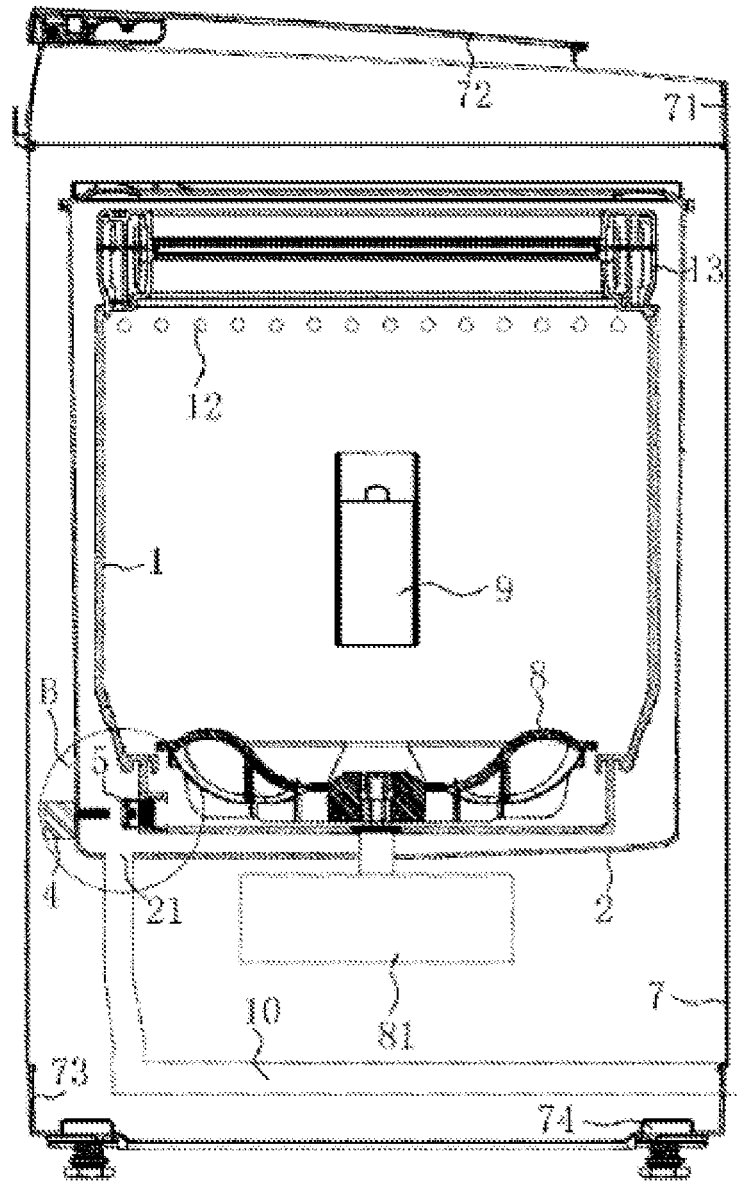
FIG. 8 is a structural schematic diagram illustrating a washing machine provided by embodiment II.
Figure 9:
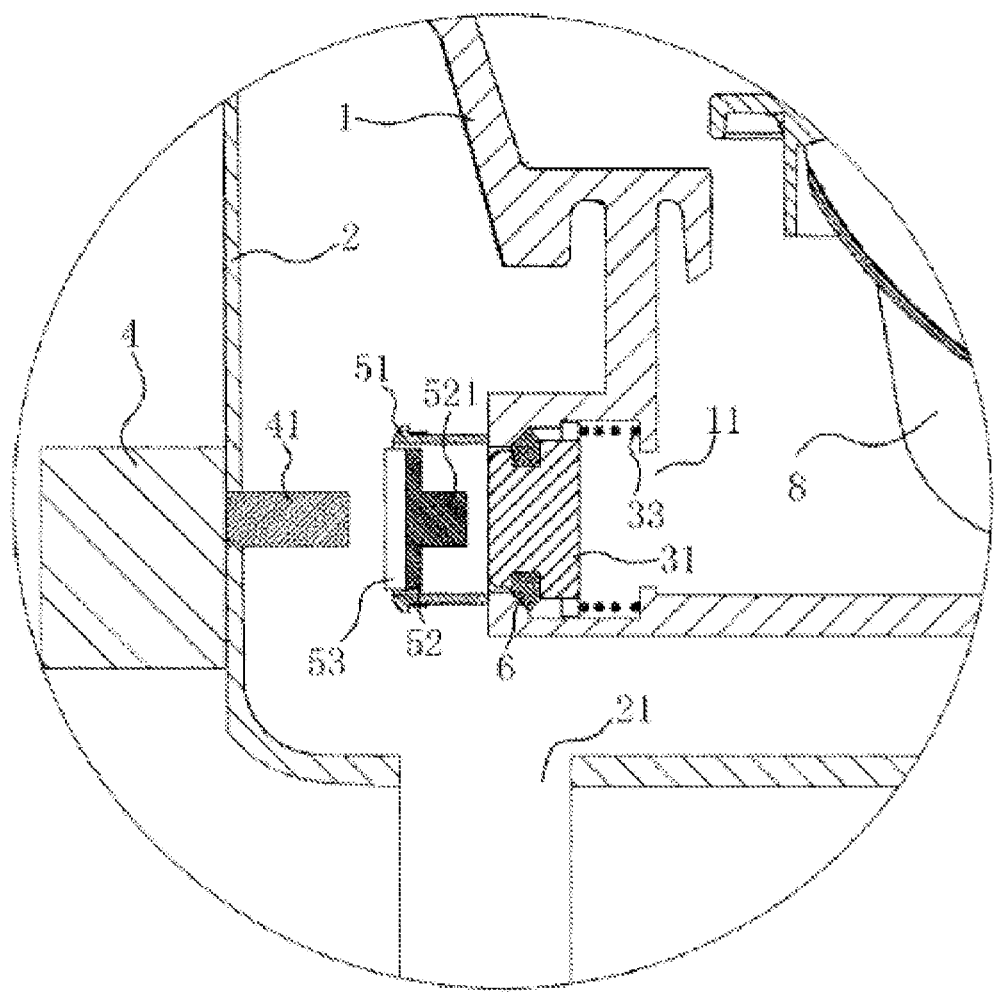
FIG. 9 is a partial enlarged view at B in FIG. 8.

As shown in FIG. 8 to FIG. 9, the drainage valve 3 of the present embodiment is arranged on the side wall of the inner drum 1. The power device is arranged on the side wall of the outer drum 2. It should be noted that the inner drum drainage hole 21 is still arranged on the bottom of the outer drum 2, and the bottom of the valve core of the drainage valve 3 is coplanar with the bottom of the inner drum 1, so that the water in the inner drum can be ensured to be completely discharged, avoiding that the remaining washing water remains in the inner drum 1.

INDUSTRIAL APPLICABILITY

The washing machine of the present disclosure can prevent the dirt, the detergent and the like from remaining on the drum wall, prevent the bacterial growth; effectively reduce the water amount of laundry and save the water resource; and realize the opening or closing of the drainage valve without positioning the drainage valve.

What is claimed is:

1. A washing machine, comprising an inner drum and an outer drum, wherein:
    a bottom or a side wall of the inner drum is provided with an inner drum drainage hole, the inner drum drainage hole is provided with a drainage valve, and the outer drum is provided with a power device configured to push a valve core of the drainage valve, and an outer drum drainage hole,
    one end of the drainage valve facing toward the outer drum is provided with a drainage switch, and an extending shaft of the power device is configured to extend and touch the drainage switch to open or close the drainage valve,
    the drainage switch comprises a switch case and a button body,
    the button body comprises a touching portion and a pushing pillar, and the pushing pillar is arranged at one end of the button body facing toward the drainage valve, and configured to push the valve core of the drainage valve to move toward the inner drum, and
    the pushing pillar and a lower portion of the valve core or the whole valve core are made of magnetic materials, a polarity of one side of the pushing pillar facing toward the valve core is opposite to a polarity of one side of the valve core facing toward the pushing pillar.

2. The washing machine according to claim 1, wherein the touching portion comprises a working portion and a recess portion, and the pushing pillar and the recess portion are located at a same side of the drainage switch.

3. The washing machine according to claim 1, wherein:
    the drainage valve comprises a valve case, the valve core arranged in the valve case, and a spring; and
    a sealing groove is arranged on a side wall of the valve core, a sealing ring is arranged in the sealing groove, a top of a spool is abutted against a first end of the spring, and a second end of the spring is abutted against one end of the valve case facing toward the inner drum drainage hole.

4. The washing machine according to claim 3, wherein the sealing ring is an O-shaped rubber sealing ring, and an inner wall of the valve case is provided with a third inclined side wall fitted with the sealing ring.

5. The washing machine according to claim 3, wherein a side wall of the sealing ring in contact with the valve case is an arc shape, an inner wall of the valve case is provided with a third inclined side wall fitted with an arc shaped side wall of the sealing ring.

6. The washing machine according to claim 1, wherein a water flowing hole is arranged on a side wall of the switch case.

7. The washing machine according to claim 1, wherein the power device is a push rod motor.

8. The washing machine according to claim 1, wherein the washing machine is a pulsator washing machine or a drum washing machine.

9. The washing machine according to claim 2, wherein:
    the drainage valve comprises a valve case, the valve core arranged in the valve case, and a spring; and
    a sealing groove is arranged on a side wall of the valve core, a sealing ring is arranged in the sealing groove, a top of a spool is abutted against a first end of the spring, and a second end of the spring is abutted against one end of the valve case facing toward the inner drum drainage hole.

* * * * *